US012241752B2

United States Patent
Stormer et al.

(10) Patent No.: US 12,241,752 B2
(45) Date of Patent: Mar. 4, 2025

(54) ADJUSTING A ZOOM LEVEL OF A TRANSACTION MAP

(71) Applicant: Truist Bank, Charlotte, NC (US)

(72) Inventors: Natalie Stormer, Raleigh, NC (US); Michaela Cestari, Clayton, NC (US)

(73) Assignee: Truist Bank, Charlotte, NC (US)

( * ) Notice: Subject to any disclaimer, the term of this patent is extended or adjusted under 35 U.S.C. 154(b) by 260 days.

(21) Appl. No.: 17/976,057

(22) Filed: Oct. 28, 2022

(65) Prior Publication Data
US 2024/0142248 A1    May 2, 2024

(51) Int. Cl.
*G01C 21/34* (2006.01)
*G01C 21/36* (2006.01)
*G06Q 30/0201* (2023.01)

(52) U.S. Cl.
CPC ....... *G01C 21/3476* (2013.01); *G01C 21/367* (2013.01); *G06Q 30/0201* (2013.01)

(58) Field of Classification Search
CPC .............. G01C 21/3476; G01C 21/367; G06Q 30/0201
See application file for complete search history.

(56) References Cited

U.S. PATENT DOCUMENTS

2020/0209013 A1*    7/2020    Kornev .............. G01C 21/3682

\* cited by examiner

*Primary Examiner* — Michael D Lang
(74) *Attorney, Agent, or Firm* — Kilpatrick Townsend & Stockton LLP; Michael A. Springs, Esq.

(57) ABSTRACT

A server programmed for adjusting a familiarity score associated with a merchant location based on a transaction history associated with the merchant location is disclosed herein. The familiarity score may indicate a likelihood of a customer being geographically familiar with the merchant location. The transaction history associated with the merchant location may include a history of financial transactions executed by the customer at the merchant location. A magnitude of an adjustment may be mediated by a machine-learning algorithm trained to adjust the familiarity score to at least raise or maintain a customer engagement score with a transaction map or reduce zoom level adjustments of the transaction map by the customer. The server may also be programmed to adjust the familiarity score based on location data for a mobile device. The location data may include a time-ordered, duration-specified history of the customer relative to the merchant location. The magnitude of the adjustment may be mediated by the machine-learning algorithm. The server may also be programmed to select a zoom level of a graphical user interface (GUI), based on the familiarity score, for the transaction map containing the merchant location. The transaction map may be a navigational map displaying at least one merchant location as it relates to at least one financial transaction.

18 Claims, 5 Drawing Sheets

ADJUSTING A ZOOM LEVEL OF A TRANSACTION MAP

TECHNICAL FIELD

The present disclosure relates generally to mapping services on electronic devices and, more particularly (although not necessarily exclusively), to adjusting a zoom level of a map displaying locations associated with financial transactions.

BACKGROUND

Mapping services may provide interactive maps in a computerized environment, such as a web browser, smartphone application, or virtual assistant. Interactive maps may have a zoom functionality, which may allow a customer to view a smaller region with a greater level of detail, and a larger region with less detail. For example, a lowest zoom level may display national and geographical borders, an intermediate zoom level may display regional borders, cities, and highways, and a highest zoom level may display street addresses and close-range photographic overlays. In some instances, these interactive maps may launch with a default zoom level that is not immediately useful to a customer and may require manual adjustment by the customer.

SUMMARY

In an example, a system includes a processor and a non-transitory computer readable medium including instructions that are executable by a processing device to perform operations. The instructions can cause the processing device to adjust a familiarity score associated with a merchant location based on a transaction history associated with the merchant location, wherein the familiarity score indicates a likelihood of a customer being geographically familiar with the merchant location, wherein the transaction history associated with the merchant location includes a time-ordered history of financial transactions executed by the customer at the merchant location, and wherein a magnitude of an adjustment is mediated by a machine-learning algorithm trained to adjust the familiarity score to at least raise or maintain a customer engagement score with a transaction map or reduce zoom level adjustments of the transaction map by the customer. The instructions can further cause the processing device to adjust the familiarity score associated with the merchant location based on location data for a mobile device, wherein the location data includes a time-ordered, duration-specified history of the customer relative to the merchant location, and wherein the magnitude of the adjustment is mediated by the machine-learning algorithm trained to adjust the familiarity score to at least raise or maintain the customer engagement score with the transaction map or reduce the zoom level adjustments of the transaction map by the customer. The instructions can further cause the processor to select a zoom level of a graphical user interface (GUI), based on the familiarity score, for the transaction map containing the merchant location, wherein the transaction map is a navigational map displaying at least one merchant location as it relates to at least one financial transaction.

In an additional example, a mobile device includes a processor and a non-transitory computer readable medium including instructions that are executable by a processing device to perform operations. The instructions can cause the processing device to receive an adjusted familiarity score associated with a merchant location based on a transaction history associated with the merchant location, wherein the familiarity score indicates a likelihood of a customer being geographically familiar with the merchant location, wherein the transaction history associated with the merchant location includes a time-ordered history of financial transactions executed by the customer at the merchant location, and wherein a magnitude of an adjustment to the familiarity score is mediated by a machine-learning algorithm trained to adjust the familiarity score to at least raise or maintain a customer engagement score with a transaction map or reduce zoom level adjustments of the transaction map by the customer. The instructions can further cause the processing device to receive the adjusted familiarity score associated with the merchant location based on location data for the mobile device, wherein the location data includes a time-ordered, duration-specified history of the customer relative to the merchant location, and wherein the magnitude of the adjustment is mediated by the machine-learning algorithm trained to adjust the familiarity score to at least raise or maintain the customer engagement score with the transaction map or reduce the zoom level adjustments of the transaction map by the customer. The instructions can further cause the processing device to receive an adjusted zoom level of a graphical user interface (GUI), based on the familiarity score, for the transaction map containing the merchant location, wherein the transaction map is a navigational map displaying at least one merchant location as it relates to at least one financial transaction.

In an additional example, a computer implemented method includes adjusting a familiarity score associated with a merchant location based on a transaction history associated with the merchant location, wherein the familiarity score indicates a likelihood of a customer being geographically familiar with the merchant location, wherein the transaction history associated with the merchant location includes a time-ordered history of financial transactions executed by the customer at the merchant location, and wherein a magnitude of the adjustment is mediated by a machine-learning algorithm trained to adjust the familiarity score to at least raise or maintain a customer engagement score with a transaction map or reduce zoom level adjustments of the transaction map by the customer. The method also includes adjusting the familiarity score associated with the merchant location based on location data for a mobile device, wherein the location data includes a time-ordered, duration-specified history of the customer relative to the merchant location, and wherein the magnitude of the adjustment is mediated by the machine-learning algorithm trained to adjust the familiarity score to at least raise or maintain the customer engagement score with the transaction map or reduce the zoom level adjustments of the transaction map by the customer. The method also includes selecting a zoom level of a graphical user interface (GUI), based on the familiarity score, for the transaction map containing the merchant location, wherein the transaction map is a navigational map displaying at least one merchant location as it relates to at least one financial transaction.

DETAILED DESCRIPTION

Figure 1:
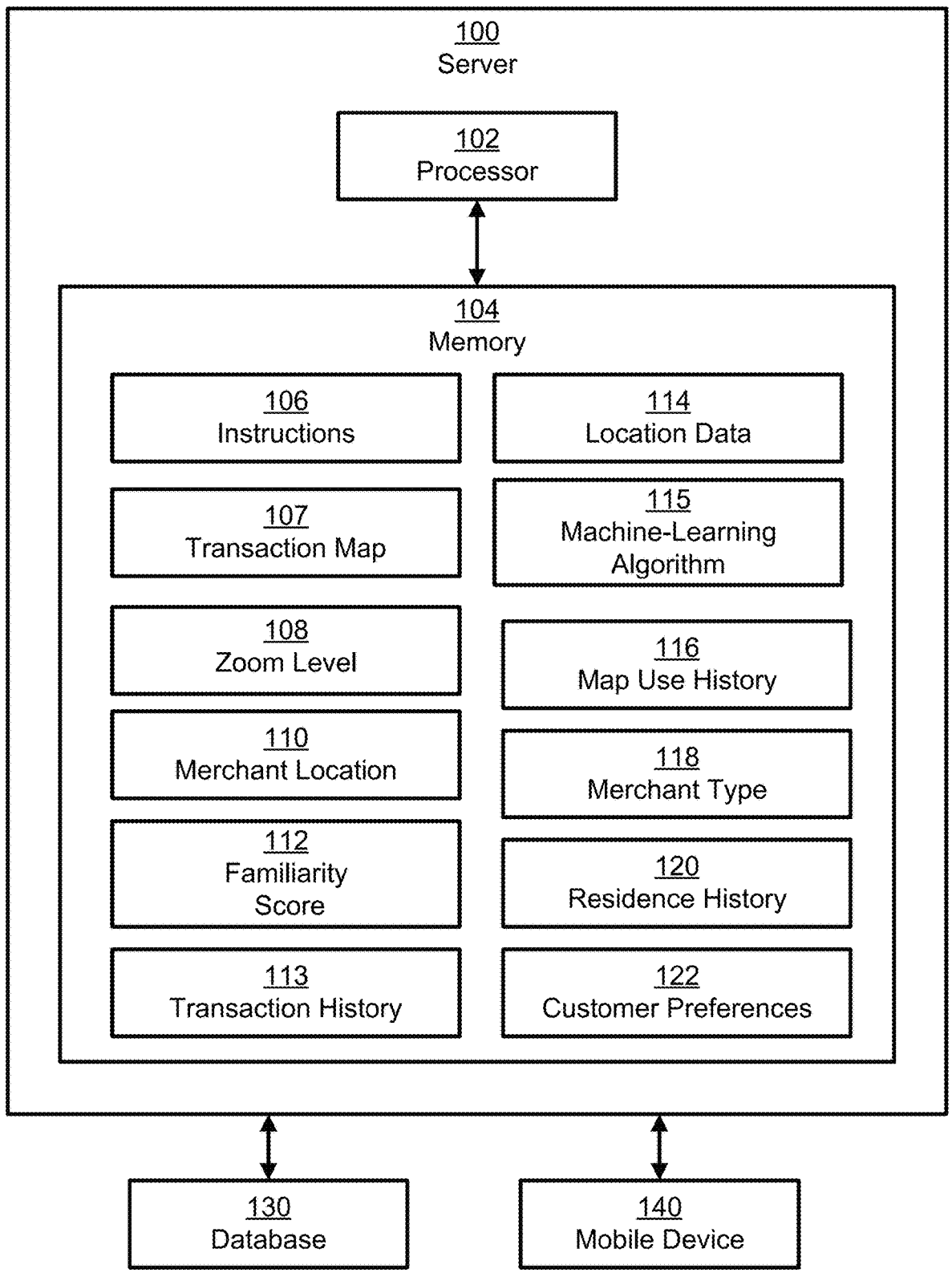
FIG. 1 is a block diagram of a server with instructions for adjusting a transaction map based on a familiarity score, according to some aspects of the present disclosure.

Certain aspects and examples of the present disclosure relate to adjusting a zoom level of a transaction map based on a familiarity score associated with a merchant. A zoom level may be a feature of a graphical user interface (GUI) for an electronically presented map. The zoom level may allow a customer to adjust between higher levels of zoom showing geographically smaller regions of a map with higher levels of detail and lower levels of zoom showing geographically larger regions of a map with lower levels of detail. A transaction map may be an electronically presented map marking locations associated with a merchant. In the case of a transaction map, a merchant may be any entity that has a recorded purchase, debt, credit, deposit, withdrawal, tax, or claim with a customer. Any entity which executes a financial transaction with a customer, or has a pending financial transaction with a customer, may be a merchant in the case of a transaction map. A familiarity score may be at least one variable meant to indicate the customer's likelihood of being geographically familiar with a merchant displayed on a transaction map.

Adjusting the zoom level of the transaction map with the familiarity score may save the customer the time and effort that may otherwise be required to make the transaction map useful to the customer. For example, a transaction map that does not adjust the zoom level based on a familiarity score may center a transaction map on a merchant location using a default zoom level. If the merchant location is in a location the customer took a short one-time trip to, the default zoom level may be too high and display an overly detailed view with street names and markings the customer may be unfamiliar with. Alternatively, the default zoom level may be too low and show the customer an overly large, abstracted view for a merchant location the customer may be more familiar with. By adjusting the zoom level for the customer with the familiarity score, the transaction map may be more useful to the customer and the customer may be more likely to use the transaction map.

The familiarity score may be based on several factors, including location data for a customer's mobile device, a history of banking transactions with the merchant marked on the transaction map, a history of the customer's adjustments of the zoom level or a history of other variables related to the customer's engagement with the transaction map. Other factors may also be considered. The weight of factors affecting the adjustment of the zoom level may be balanced by a machine-learning algorithm which may be trained to minimize the adjustments the customer makes to the zoom level after the transaction map has been displayed to the customer.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of a server 100 with instructions 106 for adjusting a transaction map 107 based on a familiarity score 112, according to some aspects of the present disclosure. The server 100 may be in operable communication with a database 130 and a mobile device 140. The server 100 includes a processor 102 that is communicatively coupled to a memory 104. In some examples, the processor 102 and the memory 104 may be distributed from (e.g., remote to) one another. The processor 102 can include one processing device or multiple processing devices. Non-limiting examples of the processor 102 include a Field-Programmable Gate Array (FPGA), an application-specific integrated circuit (ASIC), a microprocessor, etc. The processor 102 can execute instructions 106 stored in the memory 104 to perform operations. In some examples, the instructions 106 can include processor-specific instructions generated by a compiler or an interpreter from code written in a suitable computer-programming language, such as C, C++, C #, etc.

The memory 104 can include one memory or multiple memories. The memory 104 can be non-volatile and may include any type of memory that retains stored information when powered off. Non-limiting examples of the memory 104 include electrically erasable and programmable read-only memory (EEPROM), flash memory, or any other type of non-volatile memory. At least some of the memory 104 can include a non-transitory, computer-readable medium form which the processor 102 can read instructions 106. A computer-readable medium can include electronic, optical, magnetic, or other storage devices capable of providing the processor 102 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 102 can read the instructions 106.

The memory 104 can also contain a transaction map 107 with a zoom level 108 of a graphical user interface (GUI) for the transaction map 107. The memory 104 can also contain a merchant location 110, a familiarity score 112, a transaction history 113, a machine-learning algorithm 115, a map use history 116, a merchant type 118, a residence history 120, customer preferences 122, and location data 114.

The zoom level 108 may be associated with a particular merchant location 110, based on the familiarity score 112. The merchant location 110 may be a location associated with any entity that has a recorded purchase, debt, credit, deposit, withdrawal, tax, or claim with a customer. Any entity which executes a financial transaction with a customer, or has a pending financial transaction with a customer, could be a merchant in the case of a transaction map 107.

The familiarity score 112 may indicate the likelihood of a customer being geographically familiar with the merchant location 110. The familiarity score 112 may be based on a transaction history 113 associated with the merchant location 110. The transaction history 113 may be transmitted to the server 100 from the database 130. The transaction history 113 may include a time-ordered history of financial transactions executed by the customer at the merchant location 110.

The map use history 116 may be transmitted to the server 100 from the mobile device 140. The machine-learning algorithm 115 may adjust the familiarity score 112 based on the map use history 116, which may include data related to a customer's engagement with the transaction map 107 or a history of the customer's adjustments to the zoom level 108. The machine-learning algorithm 115 may be trained to adjust the zoom level 108 to maximize variables related to engagement, such as how frequently the customer uses the transaction map 107. The machine-learning algorithm 115 may be trained to adjust the zoom level 108 to minimize a number of adjustments a customer may make to the zoom level 108 after accessing the transaction map 107. In addition to being trained by the customer's own engagement and zoom level 108 adjustment data, the machine-learning algorithm 115 may be trained with metadata, such as engagement data, zoom level 108 adjustment data, and customer tailored zoom levels from other customers. The metadata used to train the machine-learning algorithm 115 could be from all other customers or could be from customers of a similar demographic. For example, the machine-learning algorithm 115 could give more weight to engagement and zoom level 108 data of customers with commonalities in residence history 120 or commonalities in location data 114. Training the machine-learning algorithm 115 to adjust the zoom level 108 with data from the customer or metadata of other customers can result in the mobile device 140 presenting a transaction map 107 with a zoom level 108 more likely to be useful to the customer.

Location data 114 may be transmitted from the mobile device 140 and may affect the zoom level 108. The customer preferences 122 can also affect the zoom level 108 of the transaction map 107. For example, a preference to display discounts may bring a map marker for a discount into the boundary of the transaction map 107, which may affect the zoom level 108.

The residence history 120 can be a history of addresses associated with the customer. The residence history 120 can include addresses from billing statements, addresses from loan applications, or addresses from background checks. The residence history 120 may be transmitted to the server 100 from the database 130.

The merchant type 118 may determine whether a real marker is displayed on the transaction map 107 or a representative marker, which may not display a true geographic location of a merchant. A representative marker may be chosen for transactions related to utilities, loan payments, credit card payments, checking payments, and electronic commerce. For example, a payment to a power utility may place a representative marker at a customer's home, rather than the location of a power plant or a utility company's headquarters. In some examples, such as transactions related to peer-to-peer mobile payment services like Venmo®, CashApp®, and Google Pay®, a representative marker may be used instead of a real marker to protect the privacy of individuals associated with the transaction.

Figure 2:
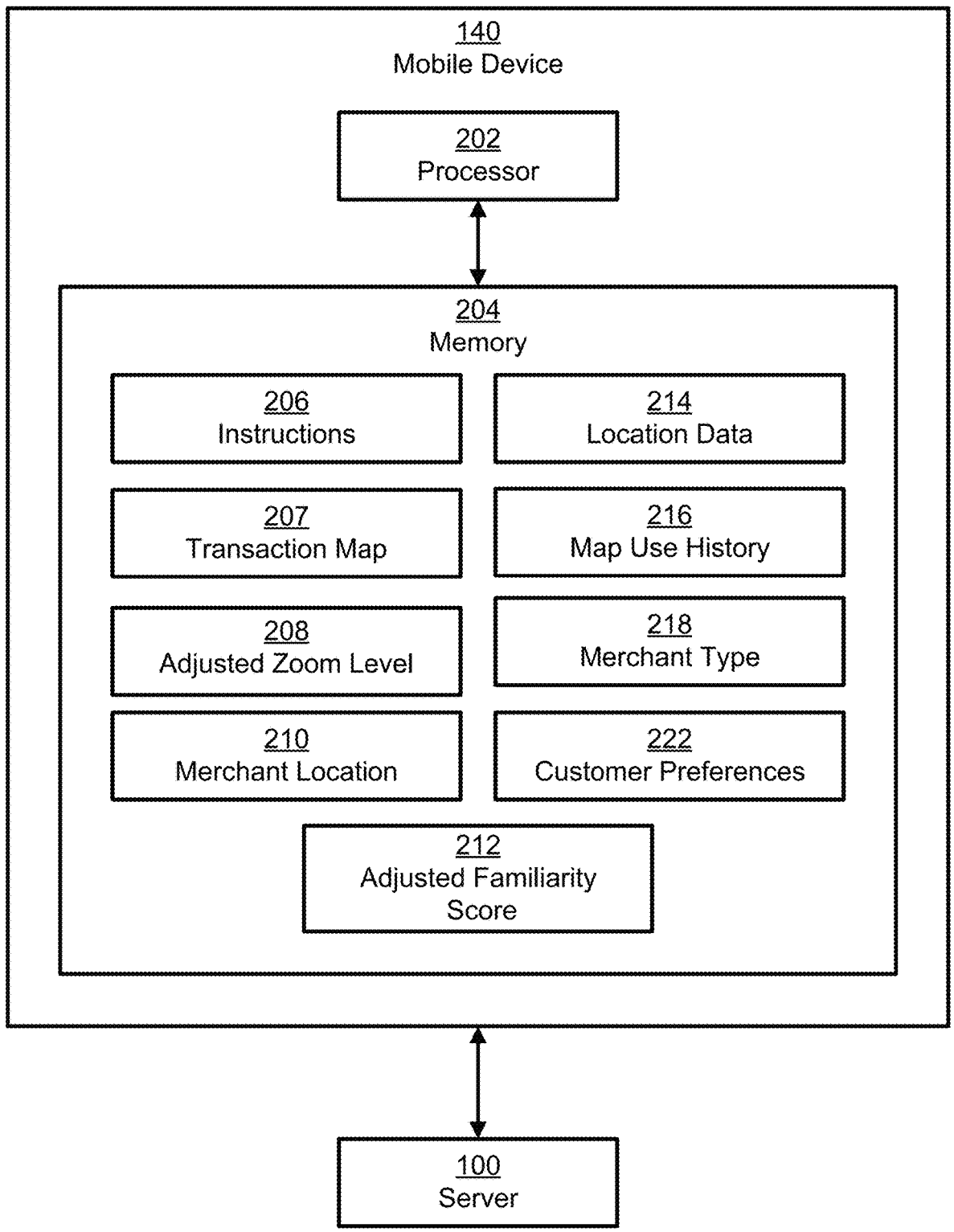
FIG. 2 is a block diagram of a mobile device with instructions for receiving a transaction map based on a familiarity score, according to some aspects of the present disclosure.

FIG. 2 is a block diagram of a mobile device 140 with instructions 206 for receiving a transaction map 207 based on a familiarity score 212, according to some aspects of the present disclosure. The mobile device 140 may be in operable communication with the server 100 of FIG. 1. The mobile device 140 includes a processor 202 that is communicatively coupled to a memory 204. In some examples, the processor 202 and the memory 204 may be distributed from (e.g., remote to) one another. The processor 202 can include one processing device or multiple processing devices. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations, in some examples, the instructions 206 can include processor-specific instructions generated by a compiler or an interpreter from code written in a suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory, computer-readable medium from which the processor 202 can read instructions 206. A computer-readable medium can include electronic, optical, magnetic, or other storage devices capable of providing the processor 202 with a computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The memory 204 may also include a transaction map 207 with an adjusted zoom level 208 of the graphical user interface (GUI) for the transaction map 207. The memory 204 can also contain a merchant location 210, an adjusted familiarity score 212, a map use history 216, a merchant type 218, customer preferences 222, and location data 214.

The instructions 206 may cause the processor 202 to receive the adjusted familiarity score 212, associated with a merchant location 210, from the server 100. The familiarity score 212 may be based on a transaction history 113 transmitted from the server 100. Alternatively, the instructions 206 may cause the processor 202 to receive the transaction history 113 from the server 100 and calibrate the adjusted familiarity score 212 based on the received transaction history 113. The adjusted familiarity score 212 may indicate the likelihood of the customer being geographically familiar with the merchant location 210. The merchant location 210 may be a location associated with any entity that has a recorded purchase, debt, credit, deposit, withdrawal, tax, or claim with a customer. Any entity which executes a financial transaction with the customer, or has a pending financial transaction with the customer, could be a merchant in the case of the transaction map 207.

The instructions 206 may cause the processor 202 to receive the adjusted familiarity score 212 associated with the merchant location 210, from a server 100. The adjusted familiarity score 212 may be based on location data 214 related to the mobile device 140. The location data 214 may be transmitted to the server 100 for consideration in arriving at the adjusted familiarity score 212. Alternatively, the instructions 206 may cause the processor 202 to use the location data 214 to calibrate the adjusted familiarity score 212 based on the location data 214.

The instructions 206 may also cause the processor 202 to receive an adjusted zoom level 208 for a graphical user interface (GUI) of the transaction map 207, which may be displayed on the mobile device 140. Alternatively, the instructions 206 may cause the processor 202 to adjust the zoom level 208 based on the received, adjusted familiarity score 212. The adjusted zoom level 208 may be based on the adjusted familiarity score 212. The instructions 206 may also cause the processor 202 to transmit map use history 216 to the server 100. The map use history 216 may include data related to a customer's engagement with the transaction map 207 or a history of the customer's adjustments to the adjusted zoom level 208.

The instructions 206 may cause the processor 202 to display the merchant location 210 on the transaction map 207 with either a real marker, displaying the true geographic location of the merchant location 210, or a representative marker, which may not display the true geographic location of the merchant location 210. Data related to real marker and representative marker selection may be determined by a merchant type 218, which may be transmitted to the mobile device 140 by the server 100. The merchant type 218 may be based on whether displaying the true geographic location or a representative location may be more useful to the customer. For example, the merchant type 218 may be for a real location if the merchant location 210 is a grocery store. Alternatively, the merchant type 218 may be for a representative location if the merchant location 210 is associated with electronic commerce, such as an Amazon® purchase.

The instructions 206 may cause the processor 202 to transmit customer preferences 222 to the server 100. The customer preferences 222 may be selected by the customer to cause the server 100 to consider factors other than a familiarity score 212 for determining the adjusted zoom level 208 that may be ultimately received by the mobile device 140. For example, the customer preferences 222 may indicate a preference to display discounts, which may adjust the boundary of the transaction map 207 to include map markers for discounts.

Figure 3:
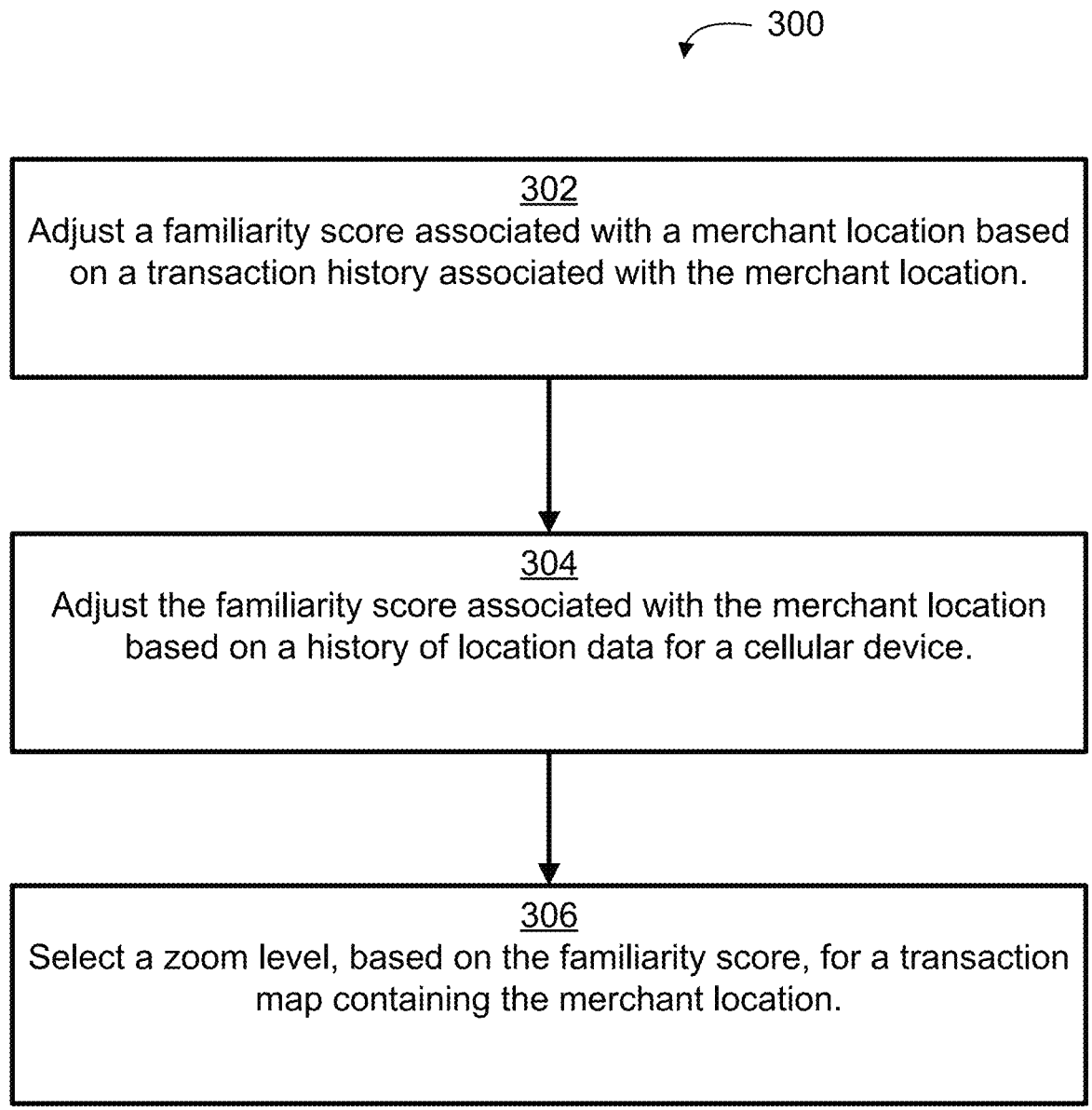
FIG. 3 is a flowchart of an example of a process for adjusting a transaction map based on a familiarity score, according to some aspects of the present disclosure.

FIG. 3 is a flowchart 300 of an example of a process for adjusting a transaction map 107 based on a familiarity score 112, according to some aspects of the present disclosure. Some examples may include more steps, fewer steps, different steps, or a different combination of steps than is shown in FIG. 3. The steps of FIG. 3 are described below with reference to the components of FIG. 1 described above.

In block 302, the server 100 may adjust the familiarity score 112 associated with the merchant location 110 based on the transaction history 113 associated with the merchant location 110. The familiarity score 112 may indicate how likely a customer is to be geographically familiar with the merchant location 110. The transaction history 113, which may include a time-ordered history of financial transactions executed by the customer at the merchant location 110, may also affect the familiarity score 112. The magnitude of the adjustment of the familiarity score 112 may be mediated by the machine-learning algorithm 115, which may be trained to raise or maintain a customer engagement score as part of a transaction map use history 116.

In block 304, the server 100 may adjust the familiarity score 112 associated with the merchant location 110 based on location data 114 from a mobile device of the customer. The location data 114 may include a time-ordered, duration-specific history of the customer relative to the merchant location 110. The magnitude of the adjustment to the zoom level 108 may also be mediated by the machine-learning algorithm 115 to raise or maintain the customer engagement score.

In some examples, the server 100 may use the location data 114 to adjust the familiarity score 112 based on a transaction history with an alternate merchant location of the same franchise as the as the primary merchant location 110. For example, a customer may frequent a coffeehouse close to their home address, but on one occasion buy coffee at a coffeehouse of the same franchise at a different location, 30 miles away from their home. When the customer views the transaction map 107 associated with the transaction at this different location, the zoom level 108 may be higher, and the transaction map 107 have more detail of a smaller geographical area, than if the customer was viewing a transaction map 107 for a transaction with a merchant location and franchise they rarely frequent that is also 30 miles away from their home. In some such examples, the machine-learning algorithm 115 may be trained to adjust the familiarity score 112 to raise or maintain the customer's engagement score.

In some examples, the server 100 may use the location data 114 to adjust the familiarity score 112 if the merchant location 110 is a proximal merchant location with an existing familiarity score 112. For example, if a customer frequents a coffeehouse with a high familiarity score 112, and the customer buys a wrench at a hardware store next door to the coffeehouse, but the customer has never shopped at this hardware store before, when the customer views the transaction map 107 associated with the transaction at the hardware store, the zoom level 108 may be similar to the zoom level for the coffeehouse with the high familiarity score 112. In some such examples, the machine-learning algorithm 115 may be trained to adjust the familiarity score 112 to raise or maintain the customer's engagement score.

In some examples, the server 100 may use metadata related to the relationships between other customer's familiarity scores and customer tailored zoom levels to determine the zoom level 108 for the transaction map 107. For example, a customer may have a familiarity score 112 of 67 for a particular merchant location 110. Other customers with similar familiarity scores for the same merchant location 110 may prefer a zoom level 108 that results in a boundary of the transaction map 107 to be 15 miles across. As a result, the server 100 may adjust the zoom level 108 to be closer to the 15 miles across figure. In some such examples, the machine-learning algorithm 115 may be trained to adjust the familiarity score 112 to raise or maintain the customer's engagement score.

In block 306, the server 100 may select a zoom level 108, based on the familiarity score 112, for the transaction map 107 containing the merchant location 110. The transaction map 107 may be a navigational map displaying at least one merchant location 110 as it relates to at least one financial transaction relevant to the customer or one pending financial transaction relevant to the customer.

Figure 4:
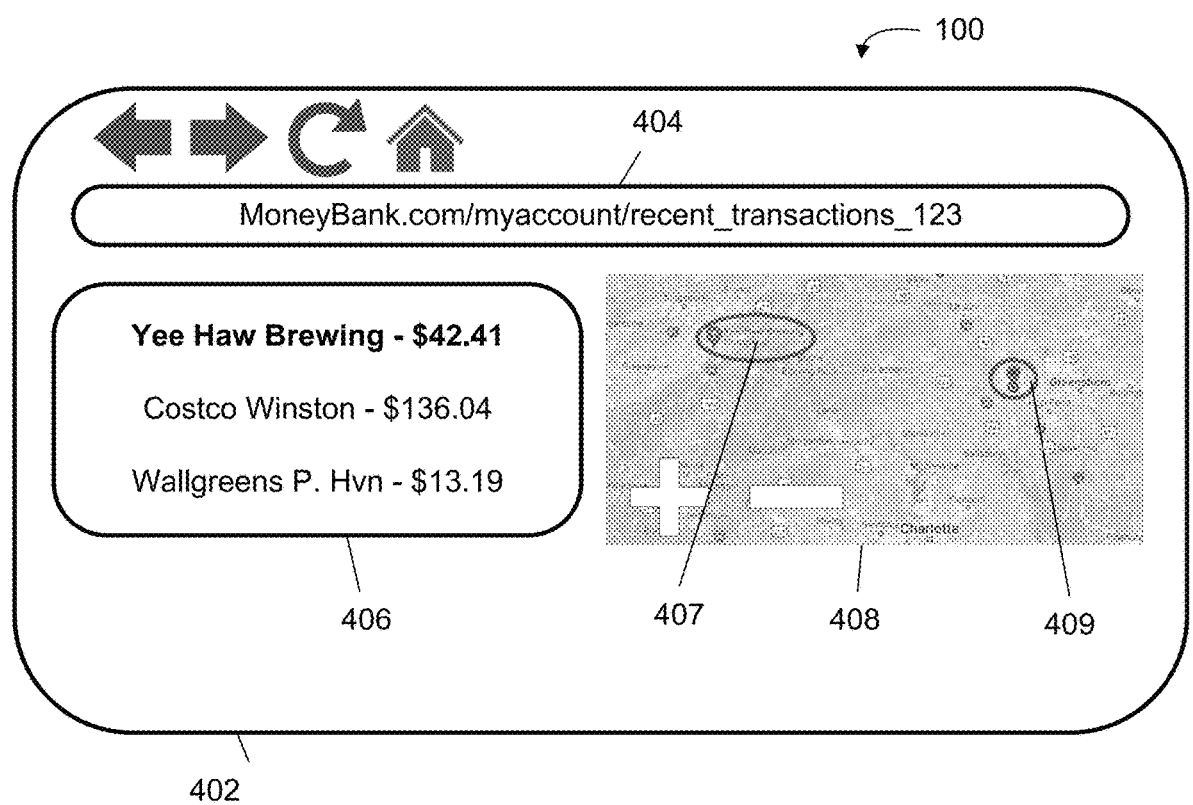
FIG. 4 is an example of a first transaction map displayed on a first web browser window, in which a zoom level is based on a familiarity score associated with a first merchant location, according to some aspects of the present disclosure.

FIG. 4 is an example of a first transaction map 408 displayed on a first web browser window 402, in which a zoom level is based on a familiarity score associated with a first merchant location 407, according to some aspects of the present disclosure. The first web browser window 402 displays a first web address 404, a first transaction statement 406, and a first transaction map 408. The first transaction map 408 has map zoom adjustment controls illustrated as a plus (+), which may increase the zoom level, and a minus (−), which may decrease the zoom level. Increasing the zoom level may adjust the map to display a geographically smaller region with a higher level of detail. Decreasing the zoom level may adjust the map to display a geographically larger region with a lower level of detail.

The first transaction map 408 marks a first merchant location 407 and marks a customer location 409. The first merchant location 407 may be associated with a transaction selected from the first transaction statement 406. In the first transaction statement 406, the transaction "Yee Haw Brewing—$42.41" may be illustrated in bold on the first transaction statement 406 to indicate selection by the customer. The selection may occur by touchscreen input, keyboard input, mouse click, scrolling, voice command, or any other suitable graphical user interface (GUI) input.

Figure 5:
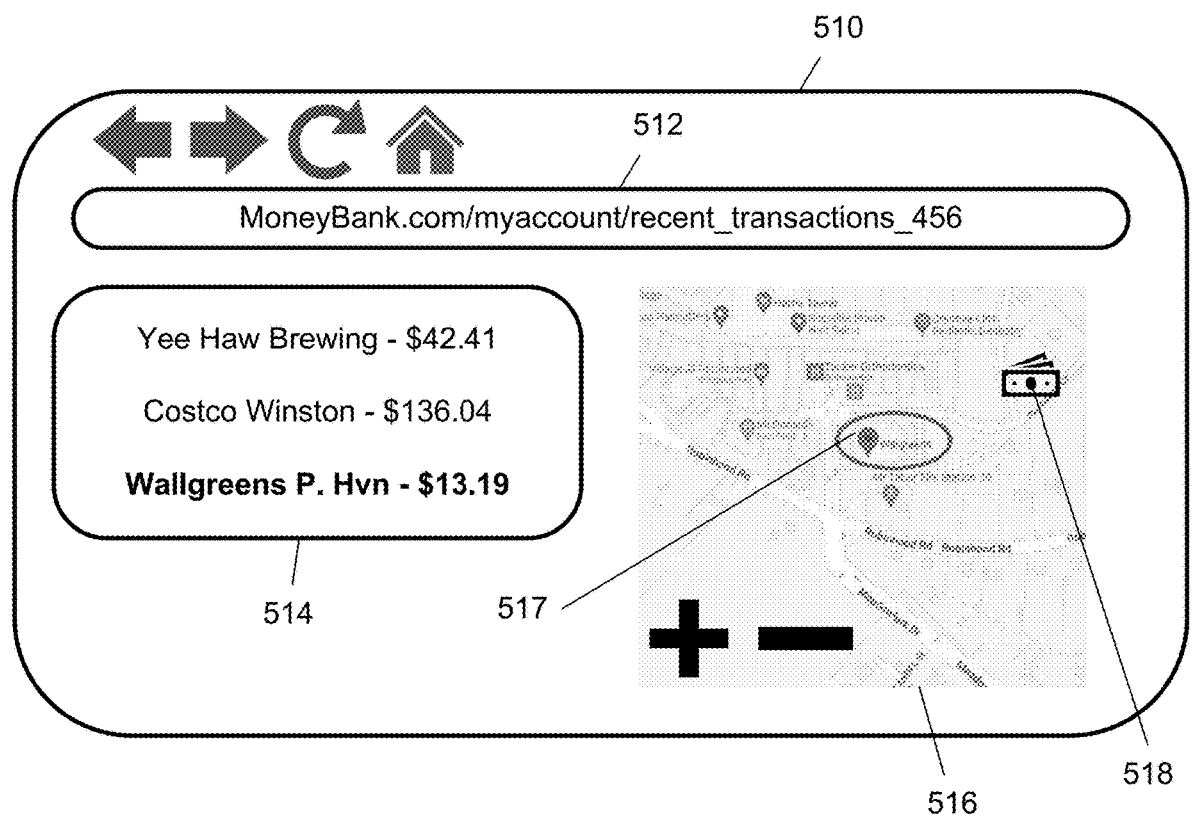
FIG. 5 is an example of a second transaction map displayed on a second web browser window, in which a zoom level is based on a familiarity score associated with a second merchant location, according to some aspects of the present disclosure.

FIG. 5 is an example of a second transaction map 516 displayed on a second web browser window 510, in which a zoom level is based on a familiarity score associated with a second merchant location 517, according to some aspects of the present disclosure. The second transaction map 516 marks a second merchant location 517 and the location of a discount 518. The second merchant location 517 may be associated with a transaction selected from the second transaction statement 514. In the second transaction statement 514, the transaction "Walgreens P. Hvn—$13.19" may be illustrated in bold on the second transaction statement 514 to indicate selection by the customer. The selection may occur by touchscreen input, keyboard input, mouse click, scrolling, voice command, or any other suitable graphical user interface (GUI) input.

The zoom level illustrated in the second transaction map 516 of FIG. 5 is higher than the zoom level illustrated in the first transaction map 408 of FIG. 4. As a result, the second transaction map 516 illustrates a higher level of detail for a smaller geographical area than the first transaction map 408. The difference in zoom levels between the second transaction map 516 and the first transaction map 408 can be because the familiarity score of the merchant associated with the first merchant location 407 of FIG. 4 can be lower than the familiarity score of the merchant associated with the second merchant location 517 of FIG. 5. The first transaction map 408 also differs from the second transaction map 416 by displaying a customer location 409. The customer location 409 may be displayed or omitted from a transaction map based on the familiarity score associated with a merchant location.

Other map markings, such as the discount 518 of FIG. 5, may be displayed or omitted from a transaction map based on the zoom level, the familiarity score of the merchant associated with the discount 518, and customer preferences. In some examples, customer preferences may adjust the zoom level to expand or reduce the geographic area covered by the second transaction map 516 to display the discount 518 that may not be visible if the zoom level of the second transaction map 516 were to be adjusted only by a familiarity score.

In one example, a server may track a transaction history of a customer who frequently shops at a particular grocery store as a merchant location. The server may associate the grocery store with location data from a customer's mobile device. The server may have recorded, in a map use history, at least one instance of the customer opening a transaction map marking the grocery store. The customer may have opened the map marking the grocery store by selecting a transaction related to the grocery store from their transaction history. The customer may not have adjusted the zoom level upon opening the transaction map marking the grocery store. As a result, the server may have recorded that the zoom level for the transaction map marking the grocery store was set to a satisfactory zoom level. The customer may have started a membership at a gym adjacent to the grocery store. The customer may select the entry for the gym from their transaction history, which may open a transaction map marking the gym. The transaction map marking the gym may open with a zoom level similar to the zoom level for the transaction map marking the grocery store. The zoom level for the transaction map marking the gym may be slightly different than the zoom level for the transaction map marking the grocery store based on inferences from a machine learning algorithm which may have concluded, based on metadata related to other customers, that the boundary of a transaction map should be extended to display a proximal merchant location with a high familiarity score when a transaction map marks a merchant location with a low familiarity.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A server comprising:
a processor and;
a non-transitory computer-readable medium comprising instructions that are executable by a processing device to cause the processing device to:
adjust a familiarity score associated with a merchant location based on a transaction history associated with the merchant location, wherein the familiarity score indicates a likelihood of a customer being geographically familiar with the merchant location, wherein the transaction history associated with the merchant location includes a time-ordered history of financial transactions executed by the customer at the merchant location, and wherein a magnitude of an adjustment is mediated by a machine-learning algorithm configured to adjust the familiarity score to at least raise or maintain a customer engagement score with a transaction map or reduce zoom level adjustments of the transaction map by the customer;
adjust the familiarity score associated with the merchant location based on location data for a mobile device, wherein the location data includes a time-ordered, duration-specified history of the customer relative to the merchant location, and wherein the magnitude of the adjustment is mediated by the machine-learning algorithm configured to adjust the familiarity score to at least raise or maintain the customer engagement score with the transaction map or reduce the zoom level adjustments of the transaction map by the customer;
select a zoom level of a graphical user interface (GUI), based on the familiarity score, for the transaction map containing the merchant location, wherein the transaction map is a navigational map displaying at least one merchant location as it relates to at least one financial transaction; and
adjust the zoom level of the transaction map based on a user indicated preference to display discounts which would otherwise be obscured by a boundary of the transaction map.

2. The server of claim 1, wherein the non-transitory computer-readable medium further comprise instructions executable by the processing device for causing the processing device to adjust the familiarity score associated with the merchant location based on a transaction history associated with an alternate merchant location of a same franchise, wherein the magnitude of the adjustment is mediated by the machine-learning algorithm configured to adjust the familiarity score to at least raise or maintain customer engagement with the transaction map or reduce the zoom level adjustments of the transaction map by the customer.

3. The server of claim 1, wherein the non-transitory computer-readable medium further comprise instructions executable by the processing device for causing the processing device to adjust the familiarity score associated with the merchant location based on a familiarity score associated with a proximal merchant location, wherein the magnitude of the adjustment is mediated by the machine-learning algorithm configured to adjust the familiarity score to at least raise or maintain the customer engagement score with the transaction map or reduce the zoom level adjustments of the transaction map by the customer.

4. The server of claim 1, wherein the non-transitory computer-readable medium further comprise instructions executable by the processing device for causing the processing device to adjust the familiarity score associated with the merchant location based on the machine-learning algorithm configured to at least raise or maintain the customer engagement score with the transaction map or reduce the zoom level adjustments of the transaction map by the customer, based on metadata related to other customer's relationships between other customer's familiarity scores and other customer's tailored zoom levels.

5. The server of claim 1, wherein the non-transitory computer-readable medium further comprise instructions executable by the processing device for causing the processing device to select between a real marker for the merchant location or a representative marker for the merchant location based on a merchant type associated with the merchant location, wherein the real marker displays a true geographic location of a merchant and the representative marker does not display a true geographic location of merchant types including utilities, loan payments, credit card payments, checking payments, and electronic commerce.

6. The server of claim 1, wherein the non-transitory computer-readable medium further comprise instructions executable by the processing device for causing the processing device to adjust the familiarity score associated with the merchant location based on a residence history, wherein the residence history includes an address from a billing statement, an address from a loan application, or an address from a background check.

7. A mobile device comprising:
a processor and;
a non-transitory computer-readable medium comprising instructions that are executable by a processing device to cause the processing device to:
receive an adjusted familiarity score associated with a merchant location based on a transaction history associated with the merchant location, wherein the familiarity score indicates a likelihood of a customer being geographically familiar with the merchant location, wherein the transaction history associated with the merchant location includes a time-ordered history of financial transactions executed by the customer at the merchant location, and wherein a magnitude of an adjustment to the familiarity score is mediated by a machine-learning algorithm configured to adjust the familiarity score to at least raise or maintain a customer engagement score with a transaction map or reduce zoom level adjustments of the transaction map by the customer;
receive the adjusted familiarity score associated with the merchant location based on location data for the mobile device, wherein the location data includes a time-ordered, duration-specified history of the customer relative to the merchant location, and wherein the magnitude of the adjustment is mediated by the machine-learning algorithm configured to adjust the familiarity score to at least raise or maintain the customer engagement score with the transaction map or reduce the zoom level adjustments of the transaction map by the customer;
receive an adjusted zoom level of a graphical user interface (GUI), based on the familiarity score, for the transaction map containing the merchant location, wherein the transaction map is a navigational map displaying at least one merchant location as it relates to at least one financial transaction; and
receive the adjusted zoom level of the GUI based on a user indicated preference to display discounts which would otherwise be obscured by a boundary of the transaction map.

8. The mobile device of claim 7, wherein the non-transitory computer-readable medium further comprise instructions executable by the processing device for causing the processing device to receive the adjusted familiarity score associated with the merchant location based on a transaction history associated with an alternate merchant location of a same franchise, wherein the magnitude of the adjustment to the familiarity score is mediated by the machine-learning algorithm configured to adjust the familiarity score to at least raise or maintain the customer engagement score with the transaction map or reduce the zoom level adjustments of the transaction map by the customer.

9. The mobile device of claim 7, wherein the non-transitory computer-readable medium further comprise instructions executable by the processing device for causing the processing device to receive the adjusted familiarity score associated with the merchant location based on a familiarity score associated with a proximal merchant location, wherein the magnitude of the adjustment to the familiarity score is mediated by the machine-learning algorithm configured to adjust the familiarity score to at least raise or maintain the customer engagement score with the transaction map or reduce the zoom level adjustments of the transaction map by the customer.

10. The mobile device of claim 7, wherein the non-transitory computer-readable medium further comprise instructions executable by the processing device for causing the processing device to receive the adjusted familiarity score associated with the merchant location based on the machine-learning algorithm configured to at least raise or maintain the customer engagement score with the transaction map or reduce the zoom level adjustments of the transaction map by the customer, based on metadata related to other customer's relationships between other customer's familiarity scores and other customer's tailored zoom levels.

11. The mobile device of claim 7, wherein the non-transitory computer-readable medium further comprise instructions executable by the processing device for causing the processing device to receive either a real marker for the merchant location or a representative marker for the merchant location based on a merchant type associated with the merchant location, wherein the real marker displays a true geographic location of a merchant and the representative marker does not display a true geographic location of merchant types including utilities, loan payments, credit card payments, checking payments, and electronic commerce.

12. The mobile device of claim 7, wherein the non-transitory computer-readable medium further comprise instructions executable by the processing device for causing the processing device to receive the adjusted familiarity score associated with the merchant location based on a residence history, wherein the residence history includes an address from a billing statement, an address from a loan application, or an address from a background check.

13. A computer-implemented method comprising:
adjusting a familiarity score associated with a merchant location based on a transaction history associated with the merchant location, wherein the familiarity score indicates a likelihood of a customer being geographically familiar with the merchant location, wherein the transaction history associated with the merchant location includes a time-ordered history of financial transactions executed by the customer at the merchant location, and wherein a magnitude of the adjustment is mediated by a machine-learning algorithm configured to adjust the familiarity score to at least raise or maintain a customer engagement score with a transaction map or reduce zoom level adjustments of the transaction map by the customer;
adjusting the familiarity score associated with the merchant location based on location data for a mobile device, wherein the location data includes a time-ordered, duration-specified history of the customer relative to the merchant location, and wherein the magnitude of the adjustment is mediated by the machine-learning algorithm configured to adjust the familiarity score to at least raise or maintain the customer engagement score with the transaction map or reduce the zoom level adjustments of the transaction map by the customer;
selecting a zoom level of a graphical user interface (GUI), based on the familiarity score, for the transaction map containing the merchant location, wherein the transaction map is a navigational map displaying at least one merchant location as it relates to at least one financial transaction; and
adjusting the zoom level of the transaction map based on a user indicated preference to display discounts which would otherwise be obscured by a boundary of the transaction map.

14. The computer-implemented method of claim 13, further comprising adjusting the familiarity score associated with the merchant location based on a transaction history associated with an alternate merchant location of a same franchise, wherein the magnitude of the adjustment is mediated by the machine-learning algorithm configured to adjust the familiarity score to at least raise or maintain the customer engagement score with the transaction map or reduce the zoom level adjustments of the transaction map by the customer.

15. The computer-implemented method of claim 13, further comprising adjusting the familiarity score associated with the merchant location based on a familiarity score associated with a proximal merchant location, wherein the magnitude of the adjustment is mediated by the machine-learning algorithm configured to adjust the familiarity score to at least raise or maintain the customer engagement score with the transaction map or reduce the zoom level adjustments of the transaction map by the customer.

16. The computer-implemented method of claim 13, further comprising adjusting the familiarity score associated with the merchant location based on the machine-learning algorithm configured to at least raise or maintain the customer engagement score with the transaction map or reduce the zoom level adjustments of the transaction map by the customer, based on metadata related to other customer's relationships between other customer's familiarity scores and other customer's tailored zoom levels.

17. The computer-implemented method of claim 13, further comprising selecting between a real marker for the merchant location or a representative marker for the merchant location based on a merchant type associated with the merchant location, wherein the real marker displays a true geographic location of a merchant and the representative marker does not display a true geographic location of merchant types including utilities, loan payments, credit card payments, checking payments, and electronic commerce.

18. The computer-implemented method of claim 13, further comprising adjusting the familiarity score associated with the merchant location based on a residence history, wherein the residence history includes an address from a billing statement, an address from a loan application, or an address from a background check.

* * * * *